United States Patent
Nishiyama et al.

(10) Patent No.: US 7,608,364 B2
(45) Date of Patent: *Oct. 27, 2009

(54) LITHIUM ION SECONDARY BATTERY

(75) Inventors: Junko Nishiyama, Minato-ku (JP); Tamaki Miura, Minato-ku (JP); Koji Utsugi, Minoto-ku (JP)

(73) Assignee: NEC Corporation, Tokyo (JP)

( * ) Notice: Subject to any disclaimer, the term of this patent is extended or adjusted under 35 U.S.C. 154(b) by 433 days.

This patent is subject to a terminal disclaimer.

(21) Appl. No.: 10/740,671

(22) Filed: Dec. 22, 2003

(65) Prior Publication Data

US 2004/0137333 A1     Jul. 15, 2004

(30) Foreign Application Priority Data

Jan. 10, 2003 (JP) ............................. 2003-004295

(51) Int. Cl.
*H01M 4/58* (2006.01)
(52) U.S. Cl. .................... 429/231.8; 429/307; 429/326; 429/329; 429/330; 429/340
(58) Field of Classification Search .............. 429/231.8, 429/307, 326, 329, 330, 340
See application file for complete search history.

(56) References Cited

U.S. PATENT DOCUMENTS

| | | | |
|---|---|---|---|
| 6,033,809 A | 3/2000 | Hamamoto et al. | |
| 6,908,712 B2 * | 6/2005 | Aoshima et al. | 429/306 |
| 6,994,936 B2 * | 2/2006 | Mori | 429/231.8 |
| 7,097,944 B2 * | 8/2006 | Murai et al. | 429/330 |
| 7,163,768 B2 * | 1/2007 | Utsugi et al. | 429/340 |
| 2003/0118914 A1 | 6/2003 | Mori | |
| 2004/0110068 A1 * | 6/2004 | Seki et al. | 429/326 |
| 2005/0100795 A1 * | 5/2005 | Utsugi et al. | 429/340 |

FOREIGN PATENT DOCUMENTS

| | | |
|---|---|---|
| EP | 1 146 586 A2 | 10/2001 |
| EP | 1 276 165 A1 | 1/2003 |
| JP | H62-100948 A | 5/1987 |
| JP | 8-69819 A | 3/1996 |
| JP | 11-250909 A | 9/1999 |
| JP | 2000-3724 A | 1/2000 |
| JP | 2000-3725 A | 1/2000 |
| JP | 2000-200603 A | 7/2000 |
| JP | 2000-235866 A | 8/2000 |
| JP | 2000-268857 * | 9/2000 |
| JP | 2000-268857 A | 9/2000 |
| JP | 2001-57230 A | 2/2001 |
| JP | 2001-118602 A | 4/2001 |
| JP | 2001-250557 A | 9/2001 |
| JP | 2002-8720 A | 1/2002 |
| JP | 2002-083632 A | 3/2002 |

(Continued)

*Primary Examiner*—Laura S Weiner
(74) *Attorney, Agent, or Firm*—Sughrue Mion, PLLC

(57) ABSTRACT

This invention provides a lithium ion secondary battery comprising a cathode, an anode and an nonaqueous electrolytic solution in which an electrolyte is dissolved in a nonaqueous solvent, wherein the anode comprises a non-graphitizable carbon as an anode activator; and the nonaqueous electrolytic solution comprises at least one anode protecting component selected from the group consisting of sultones having a 5- to 7-membered cyclic sulfonate structure and their substituted derivatives as well as vinylene carbonates and their substituted derivatives.

10 Claims, 2 Drawing Sheets

FOREIGN PATENT DOCUMENTS

| | | | |
|---|---|---|---|
| JP | 2002-270233 A | | 9/2002 |
| JP | 2003-157900 A | | 5/2003 |
| JP | 2003-243031 A | | 8/2003 |
| JP | 2003-257479 A | | 9/2003 |
| JP | 2003-297421 A | | 10/2003 |
| KR | 2001-0082428 | * | 8/2001 |

* cited by examiner

LITHIUM ION SECONDARY BATTERY

BACKGROUND OF THE INVENTION

1. Field of the Invention

This invention relates to a lithium ion secondary battery.

2. Description of the Related Art

As electronic devices have been reduced in their size and become portable, a nonaqueous electrolysis secondary battery, particularly a lithium ion secondary battery has been frequently used as a driving source for a portable electronic device such as a portable phone and a mobile terminal.

Furthermore, rapid increase of automobiles has caused serious global problems such as air pollution, global environmental pollution including discharged carbon dioxide and energy depletion. An electric car has become promising for improving these problems.

A battery for an electric car must meet requirements for battery properties such as an output density and a long life as well as an energy density.

There is substantial interest in a lithium ion secondary battery because of its improved output properties and its light weight.

Common characteristics in lithium ion secondary batteries will be described below.

Advantages 1. a higher energy density;
2. a higher output density;
3. improved high-temperature performance (efficient discharge/charge because of a reduced capacity loss or heat generation even at an elevated temperature);
4. reduced self-discharge (reduced capacity loss during storage);
5. absence of memory effect (no problems in repeated partial discharge).

Disadvantages 1. weakness to overcharge/overdischarge (a protection network is necessary);
2. an electrolytic solution comprising an organic solvent as a main component (a protection system is needed for ensuring safety during an abnormal state).

These are common characteristics in lithium ion secondary batteries.

A cathode (positive electrode) in a lithium ion secondary battery comprises a cathode activator such as $LiCoO_2$, $LiMn_2O_4$ and $LiNiO_2$ which can occlude and release lithium.

Among these, lithium manganese spinel ($LiMn_2O_4$) having a spinel structure is suitable to a battery for driving an automobile requiring a large capacity because it shows higher stability in a charged state than other lithium-containing complex oxide cathodes.

It is known that it has a smaller capacity in a 4 V range than other lithium-containing complex oxide cathodes and that its battery capacity is considerably reduced in the course of repeated charge/discharge. Thus, it is essential to improve the charge/discharge cycle properties.

An anode (negative electrode) comprises an anode activator such as carbon materials, lithium complex oxides, metals which can form an alloy with lithium, lithium metal or their mixtures, which can occlude or release lithium.

Among these, crystalline carbon materials such as coke and graphite and amorphous carbons such as non-graphitizable carbon (hard carbon) are used as an anode material because of absence of short-circuit with a cathode due to dendritic growth of electrodeposited lithium or lithium loss from an anode.

A highly crystalline graphite anode shows a higher discharge voltage and improved flatness in a voltage.

However, a current capacity per a unit weight of carbon (mAh/g) is 372 mAh/g is believed to be a theoretical upper limit because in a charged stage, lithium ions enter between graphite crystal layers of anode up to a ratio of one lithium atom to six carbon atoms.

On the other hand, non-graphitizable carbon (hard carbon) anode shows lower flatness in a voltage and continuous and gradual reduction of a voltage in the course of discharge. However, a crystallite orientation is random and a charge mechanism is different from that in a graphite anode so that a current capacity per a unit weight is higher than that in a graphite anode, and thus, an anode exhibiting more than 400 mAh/g has been developed.

Operation of an electronic device requires supply of a certain level of voltage, and a graphite anode showing a voltage with good flatness is preferable. In an automobile, a graphite anode showing a higher discharge voltage and higher flatness thereof is also suitable.

On the other hand, for a hybrid electric car in which an intermediate state of charge (SOC: State of Charge) is consistently maintained and frequently repeats a discharge/charge cycle, a non-graphitizable carbon anode showing gradual reduction in a voltage is rather suitable and advantageous because of easier charge control. Furthermore, a hybrid car requires that a regenerative charge during breaking is efficiently received by a small battery. Since a non-graphitizable carbon anode shows gradual reduction in a voltage depending on a discharge quantity, a battery using the anode can receive a large regenerative current.

A hybrid car using electricity and gasoline is not a ZEV (zero exhaust vehicle) like an electric car, but is a low-pollution car discharging a substantially less amount of harmful matters such as $CO_2$ and $NO_2$ than an existing car and showing a higher fuel efficiency. It has been, therefore, intensely developed and become considerably popular.

In terms of obtaining a large current capacity using a non-graphitizable carbon anode, Japanese Laid-open Patent Publication No. 1996-69819 has proposed an anode material in which a non-graphitizable carbon is coated with a graphitizable carbon or an anode material in which a graphitizable carbon is coated with a non-graphitizable carbon. However, since the anode material is a simple complex of a non-graphitizable and graphitizable carbon materials, it cannot fully solve the problem of volume variation in a graphitable carbon material associated with occlusion and release of lithium. Furthermore, a volume variation rate associated with occlusion and release of lithium is different between graphitizable carbon and non-graphitizable carbon. Therefore, as occlusion and release of lithium is repeated, detachment may occur in an interface between the graphitizable and the non-graphitizable carbons. In addition, the anode material requires heating at a high temperature of 2800° C., leading to a significantly higher production cost.

For solving the problem, Japanese Laid-open Patent Publication No. 2000-200603 has disclosed a carbon material consisting of three phases having different lattice spacings such that one particle can occlude and release ions between carbon-material layers.

In Japanese Laid-open Patent Publication No. 2000-200603, lattice spacings in a 002 plane are, for example, 0.3354 nm or more and less than 0.3375 nm in the first phase 11, 0.3375 nm or more and less than 0.3425 nm in the second phase 12, and 0.3425 nm or more in the third phase 13.

By the way, a lattice spacing in a 002 plane for graphite is 0.3354 nm, and the first phase 11 has a crystal structure similar to that of graphite.

Thus, the anode material has the combined properties of the first, the second and the third phases 11, 12, 13. Specifically, the anode material can show an improved density, a larger release capacity per a unit volume and an improved charge/discharge efficiency by the first phase 11. Furthermore, the anode material can provide a large initial occlusion capacity by the third phase 13.

Furthermore, the anode material has the first, the second and the third phases 11, 12, 13 in one particle. Significant volume variation in the first phase 11 during occlusion or release of various atoms or ions can be, therefore, absorbed by the second and the third phases 12, 13, resulting in improved cycle properties.

Table 1 shows the crystal conditions of the individual layers in the anode material. In the table, the comparative example has a low density of 1.46 g/cm$^3$ and an average lattice spacing of 0.348 nm in a 002 plane and thus, is amorphous.

TABLE 1

|  | Density (g/cm$^3$) | Lattice spacing in a 002 plane (nm) | | | Crystallite size (nm) | | |
| --- | --- | --- | --- | --- | --- | --- | --- |
|  |  | 1st phase | 2nd phase | 3rd phase | 1st phase | 2nd phase | 3rd phase |
| Example 1 | 1.67 | 0.336 | 0.342 | 0.344 | >100 | 28 | 5 |
| Example 2 | 1.61 | 0.337 | 0.339 | 0.343 | 86 | 36 | 6 |
| Example 3 | 1.76 | 0.336 | 0.338 | 0.344 | >100 | 56 | 7 |
| Comp. Example | 1.46 |  | 0.348 |  |  | 2 |  |

In the publication, the anode material was used to prepare an anode, which was then used a secondary battery. The battery was prepared and an evaluation thereof was conducted as follows.

N-methyl-2-pyrrolidone as a solvent was added to a mixture of 90 wt parts of the anode material obtained and 10 wt parts of polyvinylidene fluoride as a binder to prepare an anode mixture paste, which was then evenly applied to a copper foil. After fully drying the anode mixture, it was peeled off from the copper foil and was then punched into a disk with a diameter of 15.5 mm to provide an anode.

After preparing the anode, it was used to prepare a coin form of secondary battery. In the process, there were used a cathode formed by punching a lithium metal plate with a thickness of 0.8 mm into a disk with a diameter of 15.5 mm; an electrolytic solution prepared by adding LiPF$_6$ to a 1:1 (by volume) solvent mixture of ethylene carbonate and dimethyl carbonate in a rate of 1 mol/L; and a polypropylene microporous membrane as a separator.

The secondary battery thus prepared was charged/discharged to determine an occlusion capacity, a release capacity and a charge/discharge efficiency for the anode. In the process, charging was conducted by repeating a cycle that a constant current of 1 mA was applied for 1 hour and then current application was stopped for 2 hours until a battery voltage reached 4 mV. Discharging was conducted by repeating a cycle that a constant current of 1 mA was applied for 1 hour and then current application was stopped for 2 hours until a battery voltage reached 1.5 V. An occlusion capacity of the anode was calculated by dividing an electricity quantity during charging by the weight of the anode material contained in the anode. An release capacity of the anode was calculated by dividing an electricity quantity during discharging by the weight of the anode material contained in the anode. These were expressed in mAh/g. In addition, a charge/discharge efficiency was determined by multiplying a ratio of a release capacity/occlusion capacity by 100. The charge/discharge efficiency indicates how much lithium ions occluded between carbon material layers are efficiently used. These results are shown in Table 2.

TABLE 2

|  | Occlusion capacity (mAh/cm$^3$) | Release capacity (mAh/cm$^3$) | Charge/discharge efficiency (%) |
| --- | --- | --- | --- |
| Example 1 | 947 | 790 | 84 |
| Example 2 | 892 | 700 | 78 |
| Example 3 | 986 | 818 | 83 |
| Comp. Example | 645 | 453 | 70 |

As a casing of a secondary battery, a laminate packing film has been developed in place of a nickel-plated iron or aluminum canister.

In addition to a mobile device, weight reduction is inevitable in an automobile battery. Thus, the above film is believed to be the most suitable form of battery casing.

An aluminum laminate film for a battery basically has a three-layer structure consisting of a substrate 101/an aluminum foil 102/a sealant as shown in FIG. 1.

The substrate 101 is a film with a thickness of 10 to 25 μm of polyester (PET) or Nylon. The aluminum foil 102 is an aluminum film with a thickness of 20 to 40 μm. The sealant 103 is a film with a thickness of 30 to 70 μm made of polyethylene (PE), polypropylene (PP), modified polypropylene (PP) or an ionomer.

The aluminum laminate film for a battery is processed into a battery casing component by thermally sealing the sealant with a seal width of 2 to 5 mm at 160 to 180° C. for about 5 sec. as shown in FIG. 2.

The sealant is selected from those in which water permeation is smaller through a seal cross section from outside and which is less swollen with a carbonate solvent as an organic solvent for a electrolyte. Furthermore, an interface between the aluminum foil and the sealant layer may be protected such that the aluminum foil is not eroded by HF generated from LiPF$_6$ as a lithium salt due to a trace amount of moisture present in the inside of the battery.

When using polyethylene (PE), polypropylene (PP) or modified polypropylene (PP) as a sealant, a water penetration is 300 ppm or less even under high-temperature and high-humidity conditions (60° C., 90% RH) for 100 days. Thus, the casing can be satisfactorily used as a battery packing component.

It has been believed that a secondary battery using a non-graphitizable carbon anode shows excellent temporal stability (storage property) of battery properties such as cycle properties and an electric capacity because a crystal is not expanded due to entering of lithium ions between graphite crystal layers during charging like a graphite anode.

It has, however, found that storage properties may be deteriorated even in a secondary battery using a non-graphitizable carbon anode.

We have found that such deterioration in storage properties in a secondary battery using a non-graphitizable carbon anode is caused by a protrusion formed in a non-graphitizable carbon (amorphous carbon) anode.

We have also found that the protrusion may be grown to several microns, causing 1. microshort-circuit between the protrusion tip and a cathode; and
2. increase in a resistance (capacity reduction) associated with increase of a gap between a cathode and an anode due to protrusion forming.

The phenomenon is prominently observed when using a laminate film rather than a nickel-plated iron or aluminum canister as a casing.

In a metal canister casing, the phenomenon may be avoided because a pressure is applied.

SUMMARY OF THE INVENTION

An objective of this invention is to solve the problems, specifically to provide a lithium ion secondary battery showing improved storage properties.

According to a first aspect of the present invention, there is provided that a lithium ion secondary battery comprising a cathode, an anode and a nonaqueous electrolytic solution in which an electrolyte is dissolved in a nonaqueous solvent, wherein the anode comprises a non-graphitizable carbon as an anode activator; and the nonaqueous electrolytic solution comprises at least one anode protecting component selected from the group consisting of sultones having a 5- to 7-membered cyclic sulfonate structure and their substituted derivatives as well as vinylene carbonates and their substituted derivatives.

According to the first aspect of the invention, the anode protecting component may be at least one selected from the group consisting of sultones represented by general formula (1):

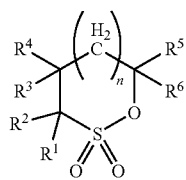

(1)

wherein $R^1$, $R^2$, $R^3$, $R^4$, $R^5$ and $R^6$ independently represent hydrogen, alkyl having 1 to 12 carbon atoms, cycloalkyl having 3 to 6 carbon atoms or aryl; and n represents an integer of 0 to 2; and vinylene carbonates represented by general formula (2):

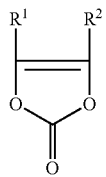

(2)

wherein $R^1$ and $R^2$ independently represent hydrogen, alkyl having 1 to 12 carbon atoms, cycloalkyl having 3 to 6 carbon atoms or aryl.

According to the first aspect of the invention, the non-graphitizable carbon may be at least one carbon obtained from charcoal, sugar, cellulose, bakelite, glassy carbon, polyvinylidene chloride, pitch derived from petroleum or coal, or coke.

According to the first aspect of the invention, the anode may comprise a coating film derived from the anode protecting component. The anode protecting component may contribute forming a passive coating film on the carbon material surface, resulting in formation of the coating film derived from the protecting component.

According to a second aspect of the present invention, there is provided that a lithium ion secondary battery comprising a cathode, an anode and an nonaqueous electrolytic solution in which an electrolyte is dissolved in a nonaqueous solvent, wherein the anode comprises an amorphous carbon as an anode activator; and the nonaqueous electrolytic solution comprises at least one anode protecting component selected from the group consisting of sultones having a 5- to 7-membered cyclic sulfonate structure and their substituted derivatives as well as vinylene carbonates and their substituted derivatives.

According to the second aspect of the invention, the anode protecting component may be at least one selected from the group consisting of sultones represented by general formula (1) and vinylene carbonates represented by general formula (2).

According to the second aspect of the invention, the amorphous carbon may have a (002) plane spacing of 0.34 nm or more and a true density of less than 1.7 g/cm$^3$.

According to the second aspect of the invention, the anode may comprise a coating film derived from the anode protecting component.

According to the first and the second aspects of the invention, a content of the anode protecting component to the nonaqueous solvent may be 0.1 to 4 wt %.

When the anode protecting component is contained in the nonaqueous electrolytic solution in 0.1 wt % or more, formation of a protrusion may be further satisfactorily prevented on the electrode surface and increase in a specific resistance and reduction in a storage capacity can be prevented. When the content is 4 wt % or less, these effects can be effectively obtained and a content of 2 wt % or less may be more effective.

According to a third aspect of the present invention, there is provided that a lithium ion secondary battery comprising a cathode, an anode and a nonaqueous electrolytic solution in which an electrolyte is dissolved in a nonaqueous solvent, wherein the anode comprises a non-graphitizable as an anode activator carbon; and the anode surface comprises a coating film inhibiting protrusion formation.

According to a fourth aspect of the present invention, there is provided that a lithium ion secondary battery comprising a cathode, an anode and a nonaqueous electrolytic solution in which an electrolyte is dissolved in a nonaqueous solvent, wherein the anode comprises an amorphous carbon as an anode activator; and the anode surface comprises a coating film inhibiting protrusion formation.

According to the third and the fourth aspects of the invention, the coating film may be derived from at least one selected from the group consisting of sultones having a 5- to 7-membered cyclic sulfonate structure and their substituted derivatives as well as vinylene carbonates and their substituted derivatives.

According to the third and the fourth aspects of the invention, the coating film may be derived from at least one selected from the group consisting of sultones represented by general formula (1) and vinylene carbonates represented by general formula (2).

According to the first to the fourth aspects of the invention, a casing for the secondary battery may be a laminate film case.

According to this invention, using a non-graphitizable carbon anode or amorphous carbon anode and adding the anode protecting component to an electrolytic solution, a coating film which inhibits protrusion growth on an anode surface can be formed to provide a secondary battery showing improved storage properties while having satisfactory cycle properties and a satisfactory electric capacity.

DETAILED DESCRIPTION OF THE INVENTION

Figure 1:
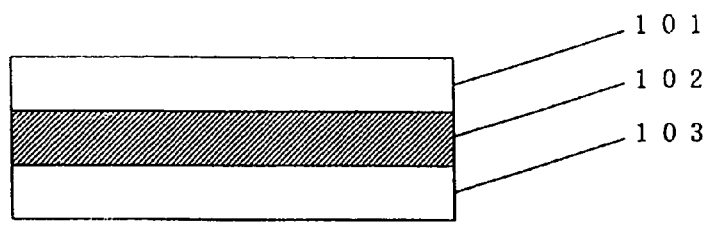
FIG. 1 shows a cross section of an aluminum laminate film for a battery.

Preferred embodiments of this invention will be described in detail.

A nonaqueous solvent may be one or more of aprotic solvents selected from cyclic carbonates such as propylene carbonate (PC), ethylene carbonate (EC), butyrene carbonate (BC), vinylene carbonate (VC); linear carbonates such as dimethyl carbonate (DMC), diethyl carbonate (DEC), ethyl methyl carbonate (EMC) and dipropyl carbonate (DPC); aliphatic carboxylates such as methyl formate, methyl acetate and ethyl propionate; γ-lactones such as γ-butyrolactone; linear ethers such as 1,2-ethoxyethane (DEE) and ethoxymethoxyethane (EME); cyclic ethers such as tetrahydrofuran and 2-methyltetrahydrofuran; dimethyl sulfoxide; 1,3-dioxolane; formamide; acetamide; dimethylformamide; acetonitrile; propionitrile; nitromethane; ethyl monoglyme; phosphoric acid triesters; trimethoxymethane; dioxolane derivatives; sulfolane; methylsulfolane; 1,3-dimethyl-2-imidazolidinone; 3-methyl-2-oxazolidinone; propylene carbonate derivatives; tetrahydrofuran derivatives; ethyl ether; anisole; N-methylpyrrolidone; and fluorocarboxylates.

Examples of an electrolyte include $LiPF_6$, $LiBF_4$, $LiClO_4$, $LiN(SO_2CF_3)_2$, $LiN(SO_2C_2F_5)_2$ and $LiC(SO_2CF_3)_3$. These electrolytes may be used alone or in combination of two or more. These electrolytes are used after being dissolved in the above nonaqueous solvent to generally 0.1 to 3 M (mole/liter), preferably 0.5 to 1.5 M.

An electrolytic solution in this invention can be prepared, for example, by preparing any of the nonaqueous solvent or a given nonaqueous solvent mixture of some of the above cyclic and linear carbonates, dissolving the electrolyte in the solvent and then dissolving a particular anode protecting component.

The anode protecting component may be at least one selected from the group consisting of sultones having a 5- to 7-membered cyclic sulfonate structure and their substituted derivatives as well as vinylene carbonates and their substituted derivatives.

The anode protecting component may be at least one selected from the group consisting of the sultones represented by general formula (1):

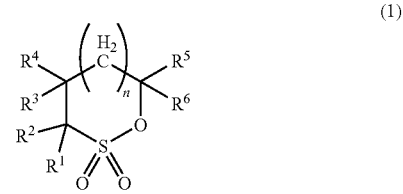

(1)

wherein $R^1$, $R^2$, $R^3$, $R^4$, $R^5$ and $R^6$ independently represent hydrogen, alkyl having 1 to 12 carbon atoms, cycloalkyl having 3 to 6 carbon atoms or aryl; and n represents an integer of 0 to 2; and the vinylene carbonates represented by general formula (2):

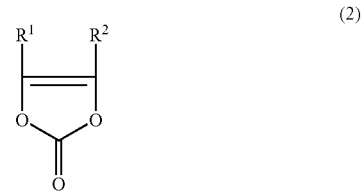

(2)

wherein $R^1$ and $R^2$ independently represent hydrogen, alkyl having 1 to 12 carbon atoms, cycloalkyl having 3 to 6 carbon atoms or aryl.

A content of the anode protecting component in the electrolytic solution in this invention (a weight ratio to a nonaqueous solvent; a total amount when using a mixture of two or more solvent) is preferably 0.1 wt % or more, more preferably 0.5 wt % or more in the light of achieving adequate effects, while being preferably 4 wt % or less, more preferably 3 wt % or less, further preferably 2 wt % or less in the light of an efficiency and effects of addition.

Examples of the sultone include 1,3-propanesultone, 1,4-butanesultone, 2,4-butanesultone [$R^1$=methyl, $R^2$=$R^3$=$R^4$=$R^5$=$R^6$=hydrogen, n=0], 1,3-butanesultone [$R^6$=methyl, $R^1$=$R^2$=$R^3$=$R^4$=$R^5$=hydrogen, n=0], 2,4-pentanesultone [$R^1$=$R^6$=methyl, $R^2$=$R^3$=$R^4$=$R^5$=hydrogen, n=0], 2-methyl-2,4-pentanesultone [$R^1$=$R^2$=$R^6$=methyl, $R^3$=$R^4$=$R^5$=hydrogen, n=0], 4,6-heptanesultone [$R^1$=propyl, $R^6$=methyl, $R^2$=$R^3$=$R^4$=$R^5$=hydrogen, n=0], 5-methyl-1,3-hexanesultone [$R^6$=isobutyl, $R^1$=$R^2$=$R^3$=$R^4$=$R^5$=hydrogen, n=0], 1-phenyl-1,3-butanesultone [$R^1$=phenyl, $R^6$=methyl, $R^2$=$R^3$=$R^4$=$R^5$=hydrogen, n=0], 1,4-hexanesultone [$R^6$=ethyl, $R^1$=$R^2$=$R^3$=$R^4$=$R^5$=hydrogen, n=1], 1,5-pentanesultone [$R^1$=$R^2$=$R^3$=$R^4$=$R^5$=$R^6$=hydrogen, n=2], 1,8-naphthalenesultone, α-hydroxy-o-toluenesulfonic acid-γ-sultone. Particularly, 1,3-propanesultone and 1,4-butanesultone are preferable.

A vinylene carbonate represented by formula (2) may be a vinylene carbonate selected from the group consisting of those wherein $R^1$ and $R^2$ represent hydrogen (vinylene carbonate), those wherein $R^1$ represents hydrogen, $R^2$ represents alkyl having 1 to 12 carbon atoms, cycloalkyl having 3 to 6 carbon atoms or aryl; and those wherein $R^1$ and $R^2$ independently represent alkyl having 1 to 12 carbon atoms, cycloalkyl having 3 to 6 carbon atoms or aryl. In particular, vinylene carbonate ($R^1$ and $R^2$ represent hydrogen) is preferable.

The anode protecting component is preferably a compound represented by general formula (1), particularly preferably 1,3-propanesultone or 1,4-butanesultone.

A nonaqueous electrolytic solution comprising the anode protecting component can be used to provide a battery in which a passive coating film inhibiting formation of a protrusion is formed on an anode surface, without deterioration in a normal battery reaction.

Components for a secondary battery other than an electrolytic solution may be selected from various conventional components with no particular limitations.

A cathode activator may be a lithium complex oxide containing lithium and another metal. For example, it may be a complex metal oxide of lithium with at least one metal selected from the group consisting of transition metals such as cobalt, manganese, nickel, chromium, iron and vanadium. Examples of such a complex metal oxide include $LiCoO_2$, $LiMn_2O_4$ and $LiNiO_2$.

A cathode can be produced, for example, by kneading the above cathode activator with a conductant agent such as acetylene black and carbon black, a binder such as polytetrafluoroethylene (PTFE) and polyvinylidene fluoride (PVDF) and a solvent to prepare a cathode mixture and applying the cathode material to an aluminum foil or stainless lath plate as a collector, which is then dried, pressed and then heated at about 50° C. to 250° C. for 2 hours.

An anode activator may be non-graphitizable carbon which can occlude and release lithium.

Non-graphitizable carbon which is also called hard carbon, refers to carbon in which even by heating at 3000° C. or higher, conversion does not occur from a random-layer structure to a graphite structure and a graphite crystallite is not grown. A carbon made by carbonization of an organic compound belongs to this type of carbon materials.

Non-graphitizable carbon can be obtained from pitch, which is generally called graphitizable carbon, derived from petroleum or coal, by adjusting a H/C atom ratio to 0.6 to 0.8.

Examples of non-graphitizable carbon include charcoal carbon, sugar carbon, cellulose carbon, bakelite carbon, glassy carbon, polyvinylidene chloride carbon, pitch carbon derived from petroleum or coal, and coke carbon, which may be used in combination of two or more.

These carbon materials are amorphous and preferably have a (002) plane spacing of 0.34 nm or more and a true density of less than 1.7 g/cm$^3$. The true density is preferably 1.2 g/cm$^3$ or more, more preferably 1.4 g/cm$^3$ or more. A true density can be determined by a gas-phase substitution method (pycnometer method) with He gas, using a commercially available apparatus.

An anode can be produced, for example, by kneading a powdered carbon material with a binder such as ethylene-propylene-diene terpolymer (EPDM), polytetrafluoroethylene (PTFE) and polyvinylidene fluoride (PVDF) and a solvent to prepare an anode mixture and applying the anode material to a collector such as a metal foil or metal plate, which is then dried, pressed and then heated.

A separator may be any of those which can separate an anode from a cathode to prevent short-circuit due to contact between these electrodes and can allow lithium ions to permeate. It may be, for example, a polyolefin microporous film such as polyethylene and polypropylene.

Figure 2:
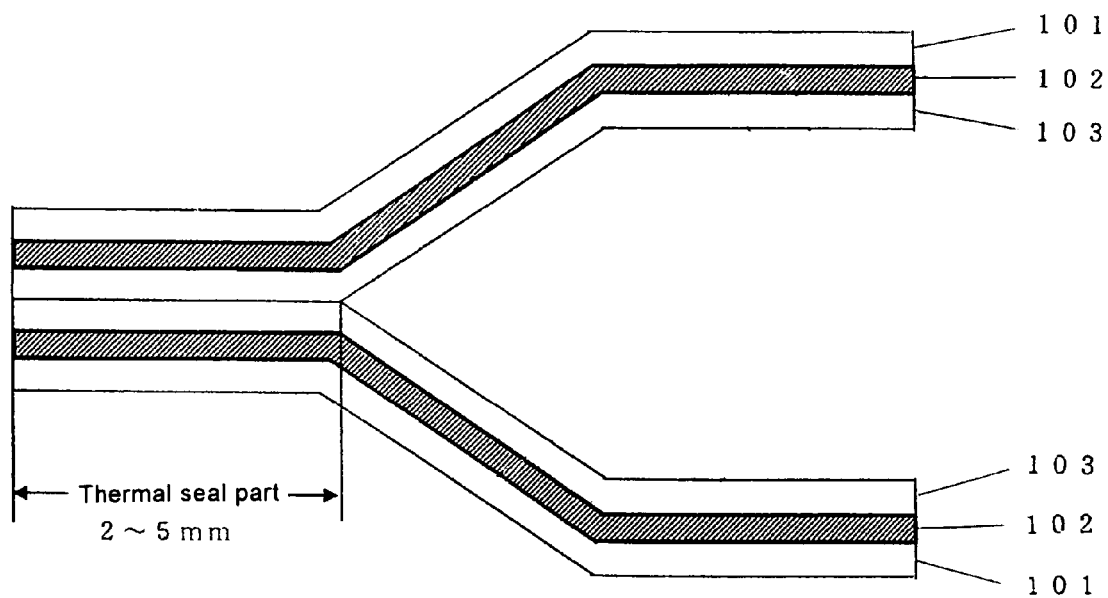
FIG. 2 shows a cross section of an aluminum laminate film for a battery after thermal sealing.

A casing for a battery in this invention may be, for example, a laminate film in which a substrate, a metal foil and a sealant are sequentially laminated. Examples of a substrate which can be used include a resin film with a thickness of 10 to 25 μm made of polyester (PET) or Nylon. A metal foil may be an aluminum film with a thickness of 20 to 40 μm. A sealant may be a rein film with a thickness of 30 to 70 μm made of polyethylene (PE), polypropylene (PP), modified polypropylene (PP) or an ionomer. The laminate film may have the structure illustrated in FIG. 1 or 2.

EXAMPLE 1

Preparation of an Electrolytic Solution

Propylene carbonate (PC) and ethyl methyl carbonate (EMC) were blended in a weight ratio of 40:60 to prepare a nonaqueous solvent. To the solvent was added 1,3-propanesultone (PS) to 1 wt %. $LiPF_6$ was dissolved in the mixture to 1 M to prepare an electrolytic solution.

Production of a Lithium Ion Secondary Battery

A cathode was prepared by blending 89 wt % of lithium manganese spinel ($LiMn_2O_4$; a cathode activator), 7 wt % of conductive carbon (acetylene black; a conductant agent) and 4 wt % of polyvinylidene fluoride (a binder), adding N-methyl-2-pyrrolidone (NMP) as a solvent to the mixture and applying the mixture to an aluminum foil, which was then dried, pressed and heated.

An anode was prepared by blending 89 wt % of non-graphitizable carbon (Kureha Chemical Industry Co., Ltd., trade name: Carbotron P(F); an anode activator), 10 wt % of conductive carbon (acetylene black; a conductant agent) and 1 wt % of polyvinylidene fluoride (a binder), adding N-methyl-2-pyrrolidone (NMP) as a solvent to the mixture and applying the mixture to a copper foil, which was then dried, pressed and heated.

The cathode and the anode were adjusted to have a substantially equal electric capacity.

The cathode and the anode were laminated via a separator of an intermediate polyolefin microporous film (Selgard Inc., trade name: Selgard 2300, a microporous film having a three-layer structure of polypropylene/polyethylene/polypropylene) and rolled as a coil to prepare a power-generating element. The element was placed in a laminate film case, into which the electrolytic solution prepared above was poured. The case was sealed to provide a lithium ion secondary battery with a size of 120×80×4 mm.

Determination of Battery Properties

Using the secondary battery, charge was conducted with a constant current of 2 A and a constant voltage at room temperature (25° C.) for 5 hours to an end voltage of 4.3 V. Discharge was then conducted with a constant current of 2 A to an end voltage of 2.5 V. The charge/discharge cycle was repeated. The battery in Example 1 showed satisfactory cycle properties.

Storage Test

The secondary battery prepared in Example 1 was evaluated for capacity storage properties.

One cycle of charge and discharge was conducted at room temperature, during which a charge/discharge current was constant (2 A). A charge capacity and a resistance in this cycle were determined as an initial capacity and an initial resistance, respectively. Here, a cutoff voltage was 2.5 V and 4.3 V in discharge and charge, respectively. Then, each battery was charged with a constant current of 2 A and a constant voltage for 2.5 hours to 4.2 V, and then left in a 55° C. incubator for 20 days, then additional 20 days (40 days in total), then additional 30 days (70 days in total) and then additional 30 days (100 days in total). After the period, the battery was again discharged with a constant current at room temperature, then subject to an additional charge/discharge cycle with the same constant current. In this process, a resistance during charging was measured and a discharge capacity was determined as a recovery capacity (storage capacity).

EXAMPLE 2

A secondary battery was prepared as described in Example 1, except that 1,3-propanesultone (PS) was added to 2 wt %.

EXAMPLE 3

A secondary battery was prepared as described in Example 1, except that 1,3-propanesultone (PS) was added to 3 wt %.

EXAMPLE 4

A secondary battery was prepared as described in Example 1, except that vinylene carbonate and 1,3-propanesultone (PS) were added to 1 wt % and 1 wt %, respectively.

COMPARATIVE EXAMPLE 1

A secondary battery was prepared as described in Example 1, except that 1,3-propanesultone (PS) was not added.

Figure 3:
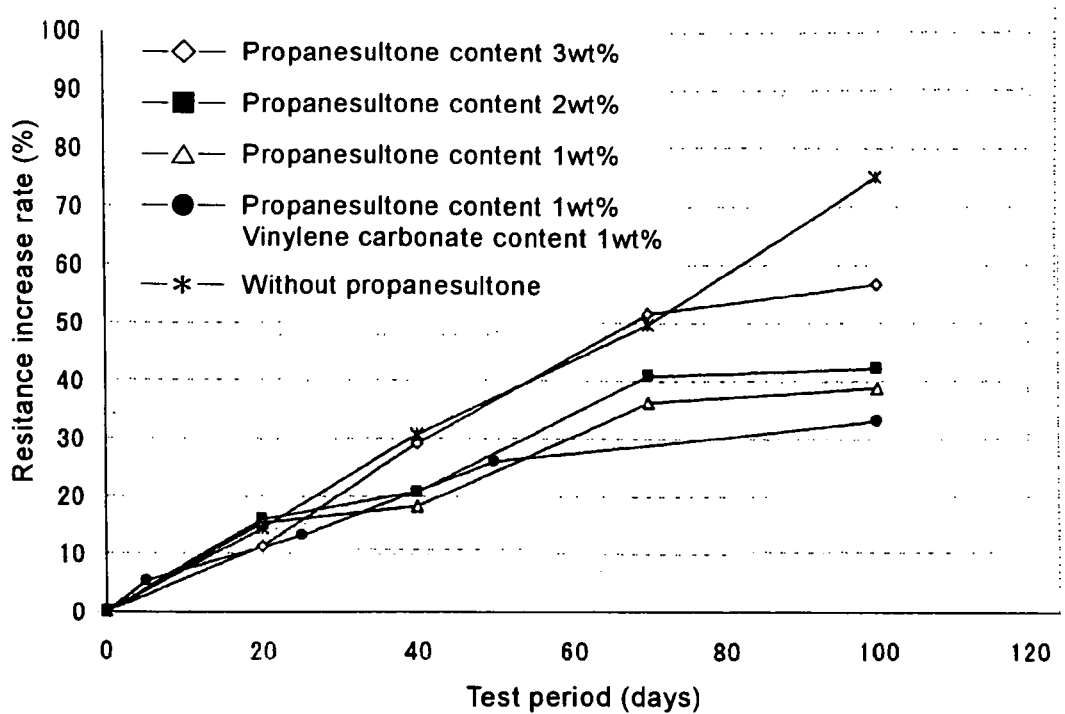
FIG. 3 is a graph showing increase in a resistance in a storage test for a secondary battery.
Figure 4:
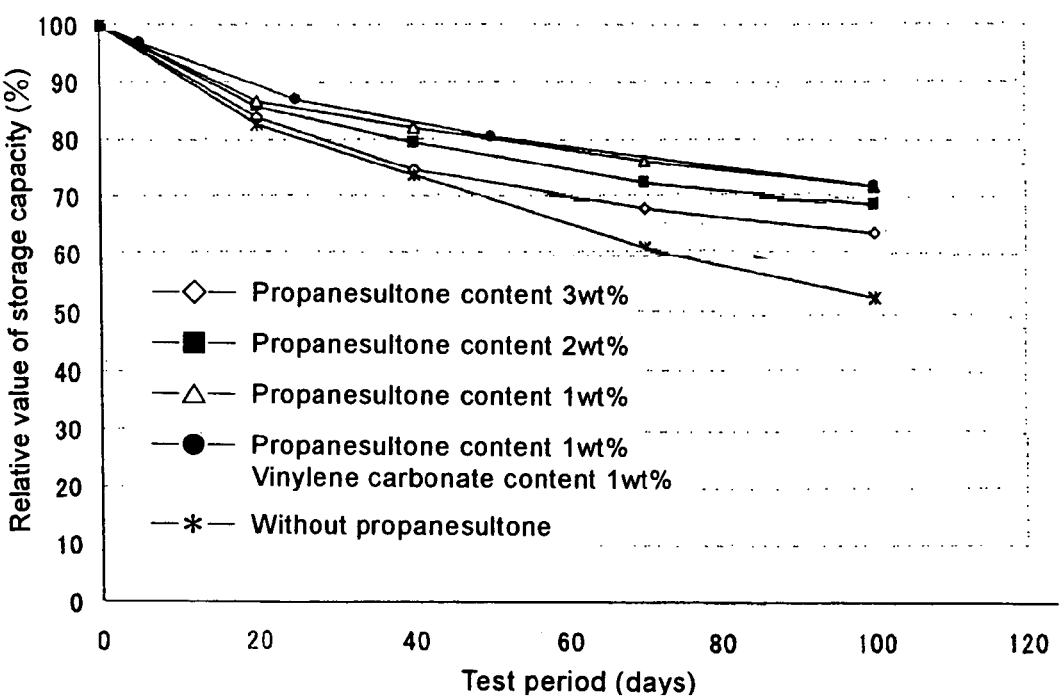
FIG. 4 is a graph showing storage capacity properties during a storage test for a secondary battery.

FIG. 3 shows variation in a rate of resistance increase in a storage test for the batteries from Examples and Comparative Example. FIG. 4 shows variation in a relative value of a storage capacity.

As seen from FIGS. 3 and 4, the batteries in Examples to which 1,3-propanesultone (PS) or vinylene carbonate were added showed a lower resistance increase and a lower storage capacity and thus improved storage properties, compared with the battery in Comparative Example to which none of the above compounds were added.

Addition to 4 wt % or more does not significantly contribute improvement in a rate of resistance increase. Thus, a content is preferably 0.1 to 4 wt %, more preferably 0.1 to 3 wt %, particularly preferably 0.1 to 2 wt %.

According to this invention, storage properties of a secondary battery would be improved because a particular compound (an anode protecting component) added to an electrolytic solution may inhibit formation of a protrusion in graphitizable carbon (amorphous carbon) constituting an anode. In a conventional secondary battery in which an electrolytic solution does not comprise an anode protecting component, a protrusion is formed in an anode, causing microshort-circuit, current convergence and increase in a distance between electrodes, which may then increase a self-discharge and resistance increase during storage and reduction in a storage capacity.

Since a protrusion formed in an electrode in a conventional secondary battery is more prominent in a laminate film case than in a metal canister case, it can be concluded that this invention is more suitable to a lithium ion secondary battery comprising a laminate film casing.

What is claimed is:

1. A lithium ion secondary battery comprising a cathode, an anode, a nonaqueous electrolytic solution, and a laminate film casing, wherein
    the anode comprises a non-graphitizable carbon which is amorphous as an anode activator; and
    the nonaqueous electrolytic solution consists of a nonaqueous solvent, an electrolyte, and an anode protecting component consisting of at least one sultone having a 5- to 7-membered cyclic sulfonate structure represented by general formula (1):

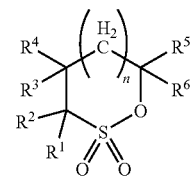

wherein $R^1$, $R^2$, $R^3$, $R^4$, $R^5$ and $R^6$ independently represent a hydrogen atom, an alkyl group having 1 to 12 carbon atoms, a cycloalkyl group having 3 to 6 carbon atoms or an aryl group; and n represents an integer of 0 to 2, and at least one vinylene carbonate represented by general formula (2):

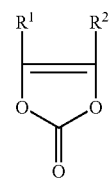

wherein $R^1$ and $R^2$ independently represent a hydrogen atom, an alkyl group having 1 to 12 carbon atoms, a cycloalkyl group having 3 to 6 carbon atoms or an aryl group, wherein the non-aqueous solvent is selected from the group consisting of propylene carbonate, ethylene carbonate, butyrene carbonate, vinylene carbonate, linear carbonates, aliphatic carboxylates, γ-lactones, linear ethers, cyclic ethers, dimethyl sulfoxide, 1,3-dioxolane, formamide, acetamide, dimethylformamide, acetonitrile, propionitrile, nitromethane, ethyl monoglyme, phosphoric acid triesters, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, anisole, N-methylpyrrolidone and fluorocarboxylates.

2. The lithium ion secondary battery as claimed in claim 1 wherein the non-graphitizable carbon is at least one carbon obtained from charcoal, sugar, cellulose, bakelite, glassy carbon, polyvinylidene chloride, pitch derived from petroleum or coal, or coke.

3. The lithium ion secondary battery as claimed in claim 1 wherein the anode comprises a coating film derived from the anode protecting component.

4. The lithium ion secondary battery as claimed in claim 1 wherein a content of the anode protecting component to the nonaqueous solvent is 0.1 to 4 wt %.

5. The lithium ion secondary battery as claimed in claim 1, wherein the amorphous carbon has a (002) plane spacing of 0.34 nm or more and a true density of less than 1.7 g/cm³.

6. The lithium ion secondary battery as claimed in claim 1, wherein the anode protecting component is 1,3-propanesultone.

7. The lithium ion secondary battery as claimed in claim 1, wherein a content of the anode protecting component to the nonaqueous solvent is 0.1 to 2 wt %.

8. The lithium ion secondary battery as claimed in claim 1, wherein the laminate film case comprises a laminate film comprising a resin film as a substrate.

9. The lithium ion secondary battery as claimed in claim 1, wherein the laminate film case comprises a laminate film in which a resin substrate film, a metal foil and a resin sealant film are laminated.

10. The lithium ion secondary battery as claimed in claim 1, wherein the laminate film case comprises a laminate film in which a resin substrate film with a thickness of from 10 to 25 um, a metal foil with a thickness of from 20 to 40 um and a resin sealant film with a thickness of from 30 to 70 um are laminated.

* * * * *